(12) United States Patent
Tane et al.

(10) Patent No.: US 6,638,469 B2
(45) Date of Patent: Oct. 28, 2003

(54) METHOD OF MANUFACTURING WAVED DISK FOR FRICTION ENGAGING APPARATUS

(75) Inventors: Toshiaki Tane, Tochigi-ken (JP);
Masatoshi Sakatou, Tochigi-ken (JP);
Moriaki Tokuda, Tochigi-ken (JP);
Tatsuhito Miura, Tochigi-ken (JP);
Makoto Amano, Shizuoka-ken (JP);
Satoshi Shimadu, Shizuoka-ken (JP)

(73) Assignees: Honda Giken Kogyo Kabushiki Kaisha, Tokyo (JP); Kabushiki Kaisha FCC, Inasa-Gun (JP)

( * ) Notice: Subject to any disclaimer, the term of this patent is extended or adjusted under 35 U.S.C. 154(b) by 310 days.

(21) Appl. No.: 09/793,392

(22) Filed: Feb. 27, 2001

(65) Prior Publication Data
US 2001/0017432 A1 Aug. 30, 2001

(30) Foreign Application Priority Data

Feb. 28, 2000 (JP) .......................................... 2000-051497
Feb. 14, 2001 (JP) .......................................... 2001-037008

(51) Int. Cl.[7] .......................... B21D 31/00; B29C 43/02; F16D 13/64

(52) U.S. Cl. .......................................... 264/320; 72/362
(58) Field of Search ............................ 264/320; 72/362

(56) References Cited

FOREIGN PATENT DOCUMENTS

JP           9-257058 A         9/1997

*Primary Examiner*—Leo B. Tentoni
(74) *Attorney, Agent, or Firm*—Armstrong, Westerman & Hattori, LLP

(57) ABSTRACT

A waved disk for use in a friction engaging apparatus has toothed portions along an outer or inner edge thereof, and is bent or undulated in a direction of the plate thickness with the circumferential direction as the direction of a wave length. In manufacturing the waved disk, there is used a press with a stationary die and a movable die. The stationary die has a plurality of radially elongated pressing portions raised from the surface of the stationary die so as to correspond to highest portions of mountains of the wave. The movable die has a plurality of radially elongated pressing portions raised from the surface of the movable die so as to correspond to lowest portions of valleys of the wave. A disk blank is pressed between the stationary and movable dies for being pressed in the direction of the plate thickness.

1 Claim, 4 Drawing Sheets

METHOD OF MANUFACTURING WAVED DISK FOR FRICTION ENGAGING APPARATUS

BACKGROUND OF THE INVENTION

1. Field of the Invention

The present invention relates to a method of manufacturing a waved disk for a friction engaging apparatus which is used as a speed-change clutch, a brake or the like in an automatic transmission for a vehicle such as a motor vehicle.

2. Description of Related Art

A friction engaging apparatus is provided with externally toothed disks (i.e., disks which have teeth along an outer edge or circumference thereof) which are engaged with an outer member by means of a spline structure, and internally toothed disks (i.e., disks which have teeth along an inner edge thereof) which are engaged with an inner member by means of a spline structure. The externally toothed disks and the internally toothed disks are brought into urging or pressing contact with each other in a direction of the thickness of the disks to effect a frictional engagement. A torque can thus be transmitted between the outer disks and the inner disks.

Conventionally, in this kind of friction engaging apparatus, there is known one in which either the externally toothed disks or the internally toothed disks are constituted by waved disks which are waved or undulated into a wave shape in the direction of the disk thickness with a circumferential direction being defined as the direction of a wave length (see Published Unexamined Japanese Patent Application No. 257058/1997).

When the above-described kind of waved disks are used, there can be obtained the following features. Namely, at the initial time of engagement, the waved disks are brought into urging contact with the remaining disks (i.e., non-waved disks) while mountains and valleys in wave shape of the waved disks are elastically deformed. Due to buffering or shock absorbing function as a result of the elastic deformation of the mountains and the valleys, a sudden rise or increase in the torque at the initial time of the engagement can be prevented. The shocks at the time of engagement can thus be alleviated. In addition, at the time of disengagement, the waved disks are rapidly departed from the remaining disks (i.e., non-waved disks) due to restoring forces of the mountains and the valleys. Dragging or dragged engagement of the disks can thus be restrained.

As a method of manufacturing this kind of waved disks, there has hitherto been known the following method. Namely, there is used a pressing apparatus which is made up of a stationary die and a movable die. The stationary die has formed therein a plurality of pressing portions which are radially provided in a manner to rise from the surface of the die so as to correspond to ridges of either the mountains or the valleys in the wave of the waved disks. The movable die has formed therein a plurality of pressing portions which are radially provided in a manner to rise from the surface of the die so as to correspond to ridges of either the valleys and the mountains in the wave of the waved disks. A disk blank (a disk raw material) which is made up of an annular flat plate having a toothed portion along its outer edge or circumference or along its inner edge is pressed in the direction of the plate thickness between the stationary die and the movable die, whereby the waved disk is formed by pressing.

At the time of pressing the waved disk as described above, the disk blank is conventionally set in position in an arbitrary phase relationship with the stationary die. As a result, the pressing portions of the stationary die or the movable die happen to coincide with the toothed portions of the disk blank. Ridges (i.e., highest portions or lowest portions) of the mountains and valleys in the wave are thus formed to be elongated up to the toothed portions, too. Here, in those mountains or valleys which have the ridges elongated up to the toothed portions, the forming or pressing load becomes large. If the press forming is carried out by controlling the load of the movable die, the wave height becomes small, resulting in deviations in the wave height from waved disk to waved disk. If, on the other hand, the press forming is carried out by controlling the stroke of the movable die, the wave height will not deviate. However, the rigidity against deformation in the direction of the thickness of the plate becomes high in those mountains and valleys which have the ridges elongated up to the toothed portion. Therefore, the load characteristics vary from waved disk to waved disk. As a consequence, due to deviations in the wave height as well as in the load characteristics, there will occur deviations also in the characteristics of alleviating the engaging shocks and in the characteristics of preventing the dragging.

In view of the above points, the present invention has an object of providing a method of manufacturing a waved disk which is uniform in the wave height as well as in the load characteristics.

SUMMARY OF THE INVENTION

In order to attain the above and other objects, the present invention is a method of manufacturing a waved disk which is used as a disk for a friction engaging apparatus, the waved disk having a toothed portion along one of an outer edge and an inner edge of the waved disk, the waved disk being bent into a wave shape in a direction of a thickness of the waved disk with a circumferential direction being defined as a direction of a wave length. The method is carried out with a pressing apparatus comprising a stationary die and a movable die, the stationary die having a plurality of pressing portions radially provided in a manner raised from a surface of the stationary die so as to correspond to ridges of one of mountains and valleys of the wave shape, the movable die having a plurality of pressing portions radially provided in a manner raised from a surface of the movable die so as to correspond to ridges of the other of the mountains and valleys of the wave shape. The method comprises pressing, between the stationary die and the movable die, a disk blank made up of an annular flat plate having a toothed portion along one of the outer edge and the inner edge to thereby form a wave disk by pressing, wherein the pressing is carried out in a state in which the toothed portion of the disk blank is positioned in such a phase as to be circumferentially away from each of the pressing portions of the stationary die and of the movable die.

According to the present invention, the mountains and valleys of the wave are formed by pressing so as to be present in a position circumferentially away from the toothed portion. Therefore, even if the press forming is carried out in either the load control or the stroke control of the movable die, there can be obtained a waved disk which is uniform in both the wave height and the load characteristics.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
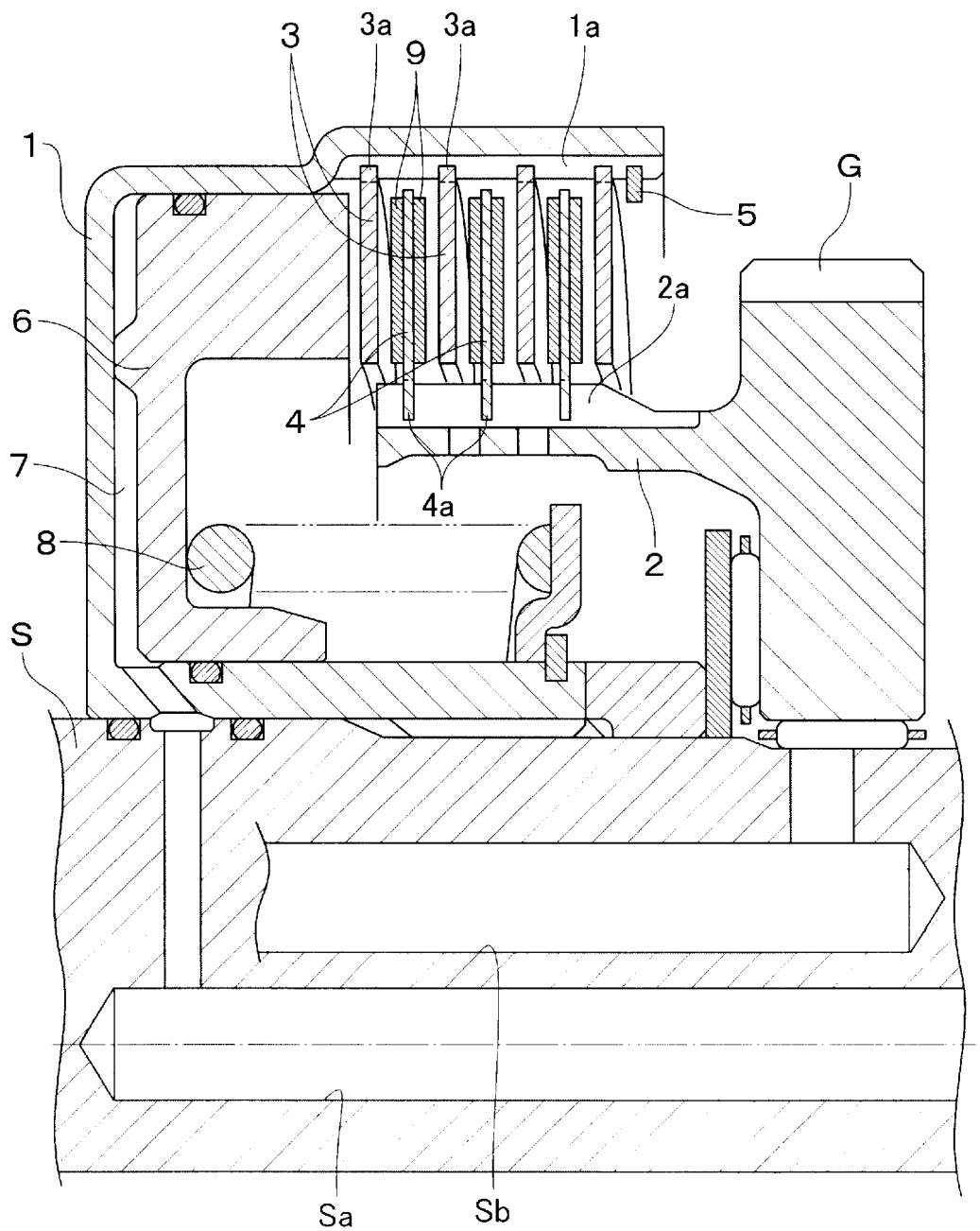
FIG. 1 is a sectional view of a hydraulic clutch which is provided with a waved disk manufactured by a method of the present invention.

FIG. 1 denotes a hydraulic clutch, which serves as a friction engaging element, for an automatic transmission of a motor vehicle. This hydraulic clutch is provided with: a clutch drum 1, defined as an outer member, which is coupled to a power transmission shaft S; and a clutch hub 2, defined as an inner member, which is formed integrally with a speed-change gear G which is rotatably supported by the power transmission shaft S. Inside the clutch drum 1, there are disposed a plurality of externally toothed disks 3 (i.e., disks 3 each of which has teeth along an outer edge or circumference thereof) and a plurality of internally toothed disks 4 (i.e., disks 4 each of which has teeth along an inner edge thereof), in an alternate order as seen in the axial direction. The externally toothed disks 3 are engaged with a splined portion 1a which is formed in the clutch drum 1, by means of a plurality of outer edge toothed portions 3a. The internally toothed disks 4 are engaged with a splined portion 2a which is formed in the clutch hub 2, by means of a plurality of inner edge toothed portions 4a.

Let an opening side of the clutch drum 1 be defined as an axially outside. The externally toothed disk 3 on the axially outermost side is prevented by a snap ring 5 from being pulled out of position relative to the clutch drum 1. Inside the clutch drum 1, there is provided a piston 6 which lies opposite to the externally toothed disk 3 on the axially innermost side. When pressurized oil is supplied to an oil chamber 7 which is defined by the end wall of the clutch drum 1 and the piston 6, through an oil passage Sa which is formed in the power transmission shaft S, the piston 6 moves axially outward against a return spring 8. The externally toothed disks 3 and the internally toothed disks 4 are urged toward each other in the axial direction into frictional engagement with each other through friction members 9 which are mounted on the internally toothed disks 4. The torque transmission between the clutch drum 1 and the clutch hub 2 is thus performed. Into the portions in which these externally toothed and internally toothed disks 3, 4 are disposed, lubrication oil is supplied through an oil passage Sb which is formed in the power transmission shaft S.

Figure 2:
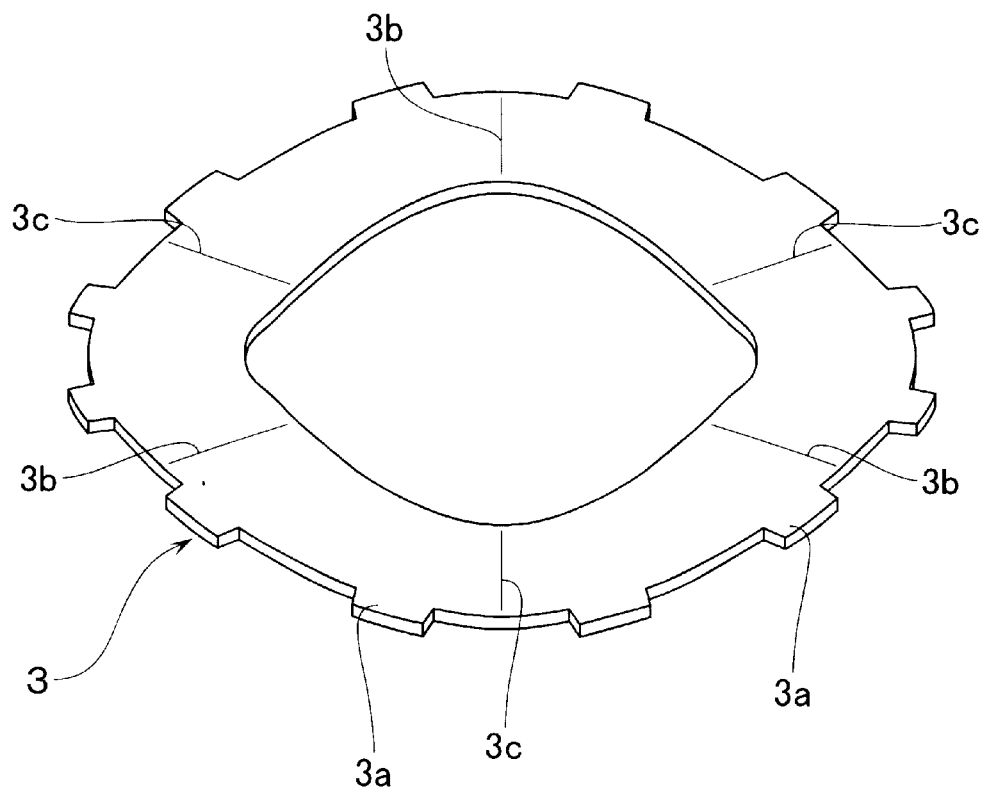
FIG. 2 is a perspective view of a waved disk.
Figure 3:
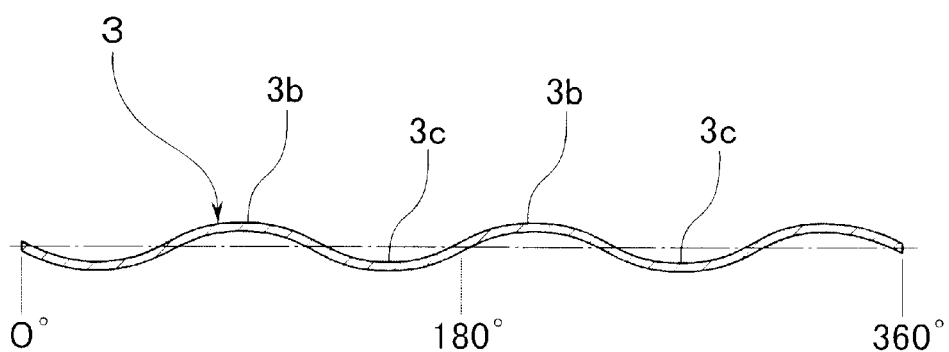
FIG. 3 is a developed sectional view of a waved disk.

Each of the externally toothed disks 3 is constituted, as shown in FIGS. 2 and 3, by a waved disk which is bent or undulated into a wave form as seen in the direction of the thickness of the disk, with the circumferential direction being defined as the direction of the wave length. In the illustrated example, the number of waves to be formed in the externally toothed disk 3 is set to be three. This number may, however, be arbitrarily selected.

Figure 4A:
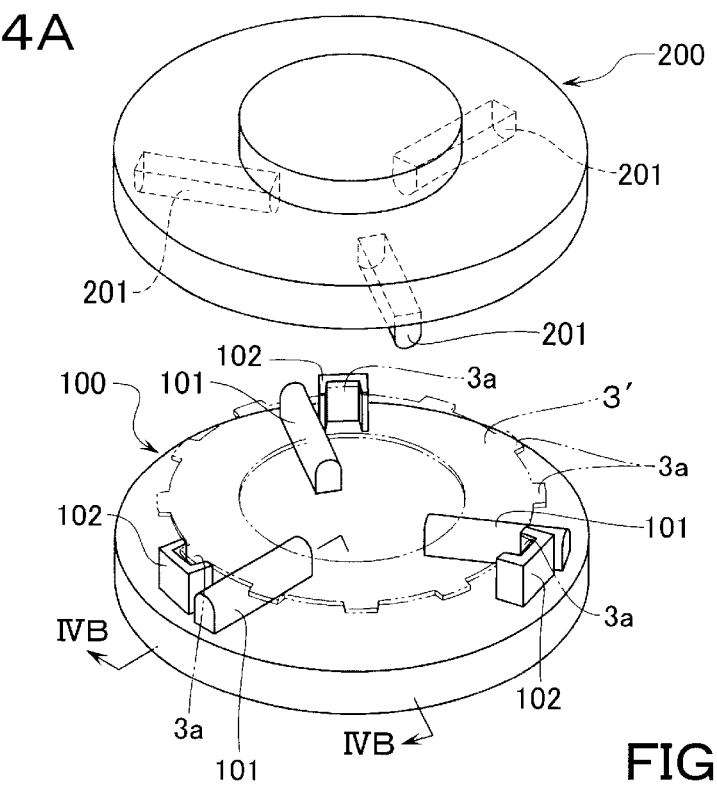
FIG. 4A is a perspective view of a pressing apparatus for manufacturing the waved disk in a state in which the dies are open.
Figure 4C:
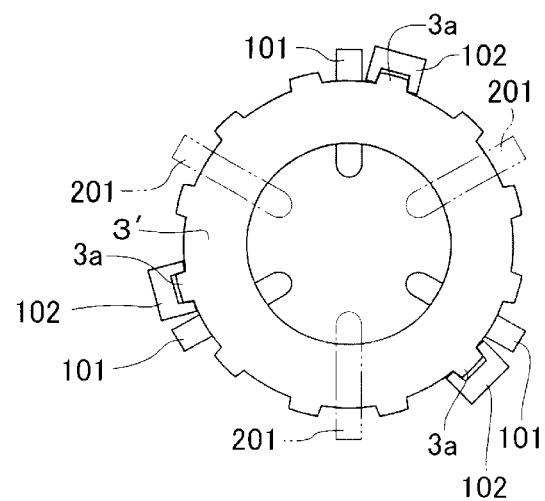
FIG. 4C is a plan view of the pressing apparatus in which a disk blank is set in position.
Figure 4B:
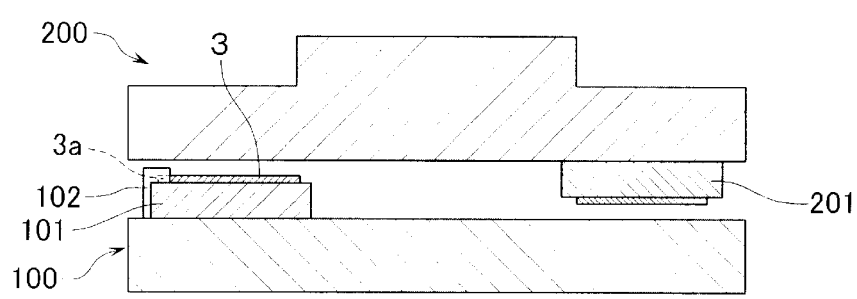
FIG. 4B is a sectional view of the pressing apparatus taken along the line IVB—IVB in FIG. 4A.

In manufacturing the externally toothed disk 3, the following steps are taken as shown in FIGS. 4A and 4B. Namely, there is used a pressing apparatus having a lower die 100 which is a stationary die, and an upper die 200 which is a movable die. A disk blank 3' which is made of an annular flat plate having toothed portions 3a along an outer edge or circumference thereof is placed in position between the lower die 100 and the upper die 200, and is pressed in the direction of the plate thickness. On an upper surface of the lower die 100, there are provided, in a manner raised from the surface of the lower die 100, a plurality of pressing portions 101 which correspond to ridges (highest portions) 3b of mountains in the wave shape of the externally toothed disk 3. On a lower surface of the upper die 200, there are provided, in a manner raised from the surface of the upper die 200, a plurality of pressing portions 201 which correspond to ridges (lowest portions) 3c of valleys in the wave shape of the externally toothed disk 3. The pressing portions 201 are disposed so as to lie between a pitch at which the above-described pressing portions 101 are positioned. By using the above-described pressing apparatus, the disk blank 3' is set in position on the lower die 100, and the upper die 200 is subsequently lowered. The disk blank 3' is thus bent downward at the portions of contact with the pressing portions 201 of the upper die 200, and is also bent upward at the portions of contact with the pressing portions 101 of the lower die 100. A wave shaped externally toothed disk 3 is thus formed by pressing.

The lower die 100 is provided with a plurality of phase-positioning guide members 102 (i.e., guide members for determining the phase) which are engaged with the tooth portions 3a of the disk blank 3'. As shown in FIG. 4C, these guide members 102 function to fix the phase of the disk blank 3' such that each of the tooth portions 3a of the disk blank 3' is positioned in a circumferentially deviated position away from each of the pressing portions 101, 201 of the lower die 100 and the upper die 200, respectively. Therefore, the wave-shaped mountains and valleys are formed by pressing such that the ridges (i.e., highest portions and lowest portions) 3b, 3c are present in positions circumferentially deviated from the toothed portions 3a. As a consequence, the load of forming the mountains and valleys as well as the rigidity against deformation in the direction of plate thickness are made uniform. Even if the forming by pressing is carried out by either the load control or the stroke control of the movable die 200, there will occur no deviation in the wave height and the load characteristics of the externally toothed disks 3a.

Figure 5:
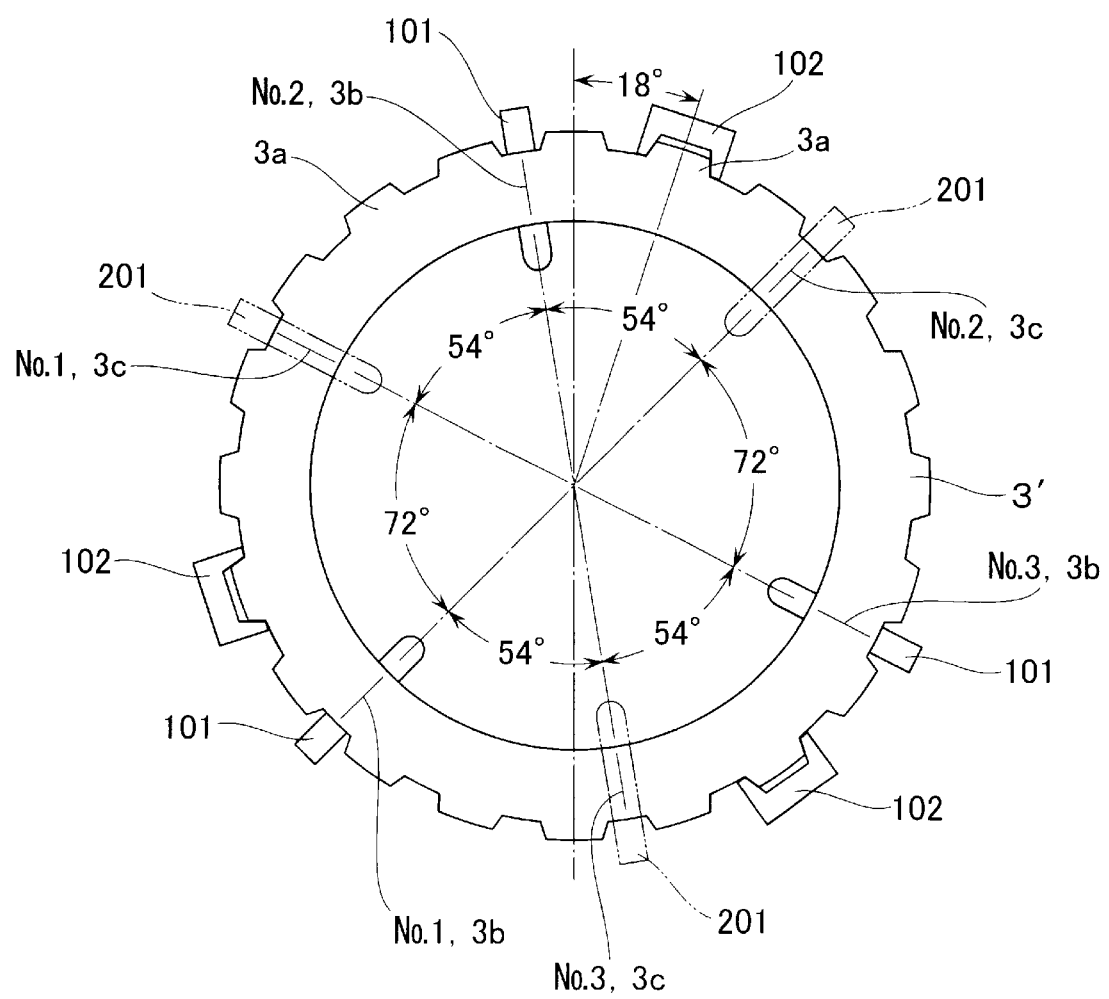
FIG. 5 is a plan view of that lower die corresponding to FIG. 4A which is used in manufacturing a waved disk having different number of toothed portions.

In the above-described embodiment, the number of the toothed portions 3a is twelve (12), and the externally toothed disk 3 has formed therein three mountains and valleys, respectively, in the wave shape at an equal angular interval of 60° therebetween. In an embodiment in which the number of the toothed portions 3a is twenty (20), for example, as shown in FIG. 5, there will be a problem in that some ridges of the mountains and the valleys will be formed in a manner to extend over some of the toothed portions 3a if the mountains and the valleys in the wave shape are formed at an equal angular interval of 60° therebetween. This problem occurs because the angle of 60° is not a multiple of the angle of 18° which is the angular distance between the respective toothed portions 3a. As a solution, in the embodiment in FIG. 5, each of the pressing portions 101, 201 of the lower die 100 and the upper die 200 are disposed in the following manner. Namely, the angular distance between the ridge 3b of No. 1 mountain and the ridge 3c of No. 1 valley as well as the angular distance between the ridge 3c of No. 2 valley and the ridge 3b of No. 3 mountain become respectively 72° which is four times the angle of 18°. Further, the angular distance between the ridge 3c of No. 1 valley and the ridge 3b of No. 2 mountain, the angular distance between the ridge 3b of No. 2 mountain and the ridge 3c of No. 2 valley, the angular distance between the ridge 3b of No. 3 mountain and the ridge 3c of No. 3 valley, as well as the angular distance between the ridge 3c of No. 3 valley and the ridge 3b of No. 1 mountain become respectively 54° which is 3 times the angle of 18°. By means of a plurality of guide members 102 which are provided in the lower die 100, the disk blank 3' is positioned such that each of the toothed portions 3a thereof is present in a position circumferentially deviated from each of the pressing portions 101, 201. Pressing of the disk blank 3' is carried out in this state.

An explanation has so far been made about the embodiment in which the externally toothed disk 3 is constituted by a waved disk. In case the internally toothed disk 4 is constituted by a waved disk, the internally toothed disk can be manufactured in a method which is similar to the above-described method. In addition, waved disks for friction engaging apparatuses other than the hydraulic clutch, such as a hydraulic brake or the like, can also be manufactured by a method which is similar to the above-described method.

As can be seen from the above-described explanations, according to the present invention, there can be obtained a waved disk which is uniform in the wave height and in the load characteristics. Therefore, an improvement can be made in the characteristics of alleviating the shocks at the time of engagement as well as in the characteristics of preventing the dragging.

It is readily apparent that the above-described method of manufacturing a waved disk for a friction engaging apparatus meets all of the objects mentioned above and also has the advantage of wide commercial utility. It should be understood that the specific form of the invention herein above described is intended to be representative only, as certain modifications within the scope of these teachings will be apparent to those skilled in the art.

Accordingly, reference should be made to the following claims in determining the full scope of the invention.

What is claimed is:

1. A method of manufacturing a waved disk which is used as a disk for a friction engaging apparatus, said waved disk having a toothed portion along one of an outer edge and an inner edge of said waved disk, said waved disk being bent into a wave shape in a direction of a thickness of said waved disk with a circumferential direction being defined as a direction of a wave length, said method being carried out with a pressing apparatus comprising a stationary die and a movable die, said stationary die having a plurality of pressing portions radially provided in a manner raised from a surface of said stationary die so as to correspond to ridges of one of mountains and valleys of the wave shape, said movable die having a plurality of pressing portions radially provided in a manner raised from a surface of said movable die so as to correspond to ridges of the other of said mountains and valleys of the wave shape, said method comprising:

pressing, between said stationary die and said movable die, a disk blank made up of an annular flat plate having a toothed portion along one of the outer edge and the inner edge to thereby form a wave disk by pressing, wherein said pressing is carried out in a state in which said toothed portion of said disk blank is positioned in such a phase as to be circumferentially away from each of said pressing portions of said stationary die and of said movable die.

* * * * *